United States Patent [19]

Davis

[11] 4,152,559
[45] May 1, 1979

[54] PRESSURE RESPONSIVE DEVICE AND PISTON SEAL

[76] Inventor: Allen V. C. Davis, 5600 Alta Canyada Rd., La Canada, Calif. 91011

[21] Appl. No.: 848,573

[22] Filed: Nov. 4, 1977

[51] Int. Cl.² .......................................... H01H 35/38
[52] U.S. Cl. ............................... 200/82 R; 200/82 C; 200/83 P; 277/165; 74/100 P; 92/168
[58] Field of Search ................. 74/100 P; 92/168; 277/165; 200/83 P, 83 J, 82 R, 82 C

[56] References Cited

U.S. PATENT DOCUMENTS

| | | | |
|---|---|---|---|
| 3,300,225 | 1/1967 | Shepler | 277/165 |
| 3,335,242 | 8/1967 | Johnson | 200/83 P |
| 3,393,917 | 7/1968 | Kendall | 277/165 |
| 3,535,480 | 10/1970 | Bahniuk | 200/83 P |

*Primary Examiner*—Gerald P. Tolin
*Attorney, Agent, or Firm*—Perry E. Turner

[57] ABSTRACT

There is shown a pressure responsive device for operating an electric switch plunger, the device having a port to receive fluid under pressure for application to a slidable piston that engages a pressure plate arranged to actuate a snap action disc spring, and thereby actuate the switch plunger via a combination motion doubler and pressure level setting mechanism. Such mechanism includes a yoke member extending from the snap spring to the switch plunger, and a helical spring surrounding the yoke and which at one end engages the pressure plate and at its other end is coupled to an adjustment member that is threaded on a housing that surrounds the helical spring and yoke member. The piston is slidable in a body that has a counterbore transition to the port, and a sealing mechanism is located in the counterbore that includes a metal sleeve that varies in wall thickness such that its outer diameter varies from a maximum at one end to a minimum at its other end, a plastic sleeve that is conformable to the lateral surface of the metal sleeve but which extends past the thinner end of the metal sleeve, and an O-ring captured between the plastic sleeve and surrounding counterbore wall, the O-ring being operable to force the extension of the plastic sleeve against the piston. The O-ring does not engage the piston, and the metal sleeve absorbs the O-ring load that normally would be applied to gripping the piston, thereby eliminating forces that would cause the device to have undesirably high friction and wide deadband, and which would otherwise dictate the use of an undesirably large diameter piston to secure a narrower deadband, lower pressure device.

9 Claims, 8 Drawing Figures

PRESSURE RESPONSIVE DEVICE AND PISTON SEAL

CROSS-REFERENCE TO RELATED APPLICATION

See my copending application, "Fluid Pressure Responsive Device," Ser. No. 801,336, filed May 27, 1977.

BACKGROUND OF THE INVENTION

1. Field of the Invention

This invention relates to fluid pressure responsive devices such as pressure switches and the like.

2. Description of the Prior Art

In pressure switches heretofore known which use pistons operable under pressure for actuating switch control mechanism, it is customary to seal the piston via an O-ring captured in the portion of the body through which the piston is movable. Because the O-ring flattens or otherwise distorts against the piston, it applies gripping force over a large surface area so as to present an undesirably large breakaway force, or stiction. Movement of the piston from either position to the other requires pressure differentials that are manifested in undesirably wide deadband characteristics. Also, such pressure responsive devices which are to operate at markedly different pressure levels require the use of pistons of markedly different diameters. Further, pistons needed for such devices used for low pressure operations are undesirably large and add to the size and weight of the device.

It is essential that a pressure responsive device operate with a sudden snap action in all environments. It is imperative that such action be manifested to a significant degree in those uses in which the small movement of the snap action disc spring is too slight, e.g., as in a safety switch. Further, it is desirable that the means to accentuate snap movement be capable of performing such function in conjunction with a mechanism suitable for presetting the level of pressure operations. Also, it is desired that the device be one that can be made inexpensively in terms of parts and the time and effort needed to assemble them.

SUMMARY OF THE INVENTION

This invention embraces a pressure responsive device in which a piston slidable in a ported body is sealed by using an O-ring to effect a fluid seal over a minimum square area substantially smaller than is possible in using the O-ring alone, such sealing being via a metal sleeve seated in a counterbore surrounding the port end of the piston, a plastic sleeve around the metal sleeve and extending past the end of the metal sleeve nearest the port, and an O-ring around the plastic sleeve and operable to conform the plastic sleeve to the lateral surface of the metal sleeve and the immediately adjacent portion of the piston confronted by the plastic sleeve extension. This invention also embraces such a device wherein a pressure plate engaged by the piston has a rim on which the body of a snap spring is fulcrumed, and a yoke member attached at one end to the inner periphery of the snap spring to undergo a multiple of the distance of movement of the piston and pressure plate. This invention also embraces a spring system for setting pressure operating levels for low pressure devices, in which a helical spring has one end attached to the pressure plate and the other end selectively positionable so as to be in tension for pressures below a predetermined level and in compression for pressures above such level for effecting snap action of the snap spring.

DESCRIPTION OF PREFERRED EMBODIMENT

Figure 1:
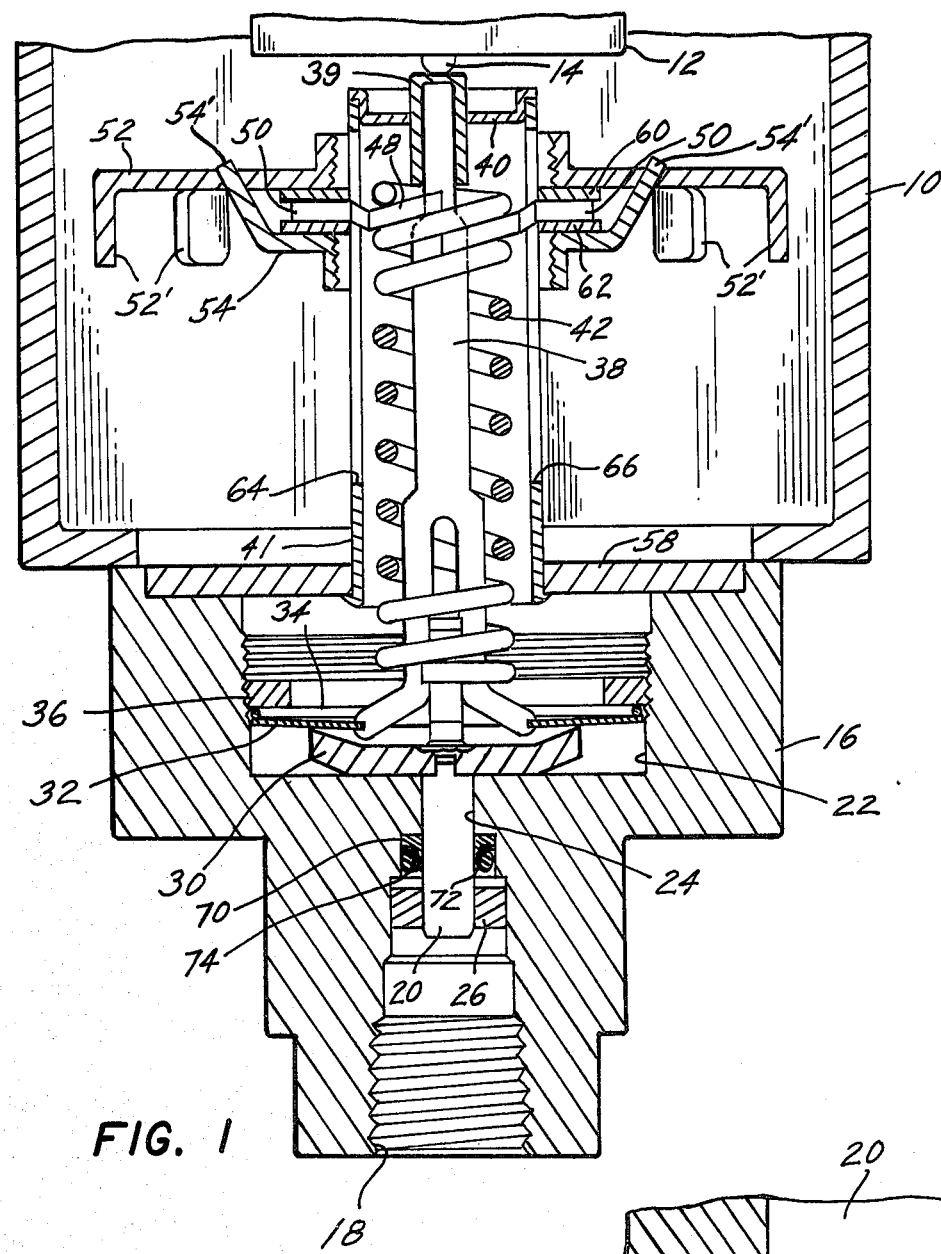
FIG. 1 is a longitudinal sectional view of a pressure switch in accordance with this invention.

Referring to FIG. 1, a fluid responsive pressure switch is shown having an upper body 10 in which an electric switch 12 is supported by suitable means (not shown). The switch 12 is a plunger actuated switch, the outer end of the plunger of which extends at 14 below the switch housing. The plunger is engaged by the upper end of switch actuating apparatus that is carried by a lower body portion 16 of the device. The upper and lower body portions 10, 16 are secured together and sealed with suitable fastening and sealing means (not shown).

The lower body 16 has a port 18 for connection to a source of fluid under pressure. Fluid entering the port 18 engages the lower end of a piston 20 which is supported in the body 16 for vertically slidable movement. In this regard, the upper end of the body 16 has an enlarged cavity 22 that is threaded as indicated, at the bottom of which is a bore 24 in which the piston is slidable. The lower end of the piston has fixed thereon a ring 26 that is slidable in a counterbore transition to the port 18.

The upper end of the piston 20 engages the lower surface of a pressure plate 30 that normally rests on the bottom of the cavity 22. The piston and pressure plate may be interengaged via a small projection on the upper end of the piston being located in a small opening in the bottom surface of the pressure plate 30. As shown, the pressure plate in cross-section is shaped to have a relatively sharp rim. Positioned against this rim is the lower surface of a snap action disc spring 32, the outer periphery of which is positioned via a retaining ring 34 and an adjustment nut member 36 that is threaded into position along the cavity wall.

The inner periphery of the disc spring 32 is engaged by the notched ends of a pair of legs of a yoke member 38. The yoke in one example is a flat element, the legs of which exhibit spring action and are stressed when engaging the disc spring so as to apply spring force against the inner diameter thereof. Such expansion against the inner diameter of the disc spring provides preloading and enhances snap of the disc spring. Preferably the notches in the legs of the yoke are tapered to accommodate disc springs of different thicknesses.

At its upper end, the yoke is fitted with a cap 39 that engages the lower end of the switch plunger 14. The plunger is depressed to actuate the switch 12 when the piston 20 is forced upwardly to effect snap movement of the inner periphery of the disc spring 32 and of the yoke 38 therewith. The upward movement of the yoke is a predetermined multiple of the distance of travel of the portion of the disc spring that is engaged by the rim of the pressure plate 30. In one example, the parts are dimensioned so the yoke undergoes double the movement of the rim-engaged part of the disc spring. Such motion doubling is effective to actuate the switch for reliable operation of a safety switch, for example. The upper end of the cap 39 is slidable in a guide disc 40 that is fitted to the upper end of a tubular housing 41 that surrounds the upper body of the yoke 38 and the cap 39.

Figure 7:
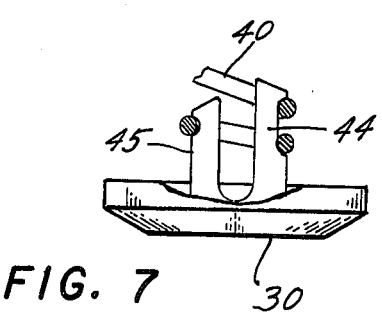
FIG. 7 is a view in elevation of the pressure plate of the device of FIG. 1, showing the spaced fingers extending from the plate and onto which the lower end of the helical spring is threaded.

Operation of the device at selected pressure levels is effected via a spring system of the invention in which a helical spring 42 within the housing 41 surrounds the yoke 38. The helical spring 42 at its lower end engages the pressure plate 30, which (see FIG. 7) has upstanding fingers 44, 45 with notched portions vertically spaced to permit the end turns of the helical spring to be threaded onto the fingers and held thereon.

Figure 6:
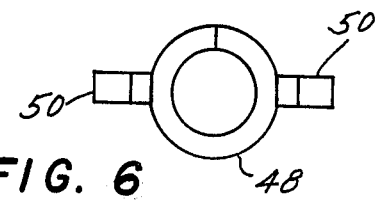
FIG. 6 is a top plan view of the catch that is threaded onto the upper end of the helical spring in the device of FIG. 1, showing the arms that extend through the tubular housing openings as seen in FIG. 4.

At its upper end, the helical spring 42 has a catch member 48 threaded thereon. The catch 48 (see FIG. 6) is a single turn member in one example, the turn of the body of such member corresponding to the pitch of the upper end turns of the helical spring. The catch 48 has oppositely directed fingers 50 which are used as a means for positioning the upper end of the helical spring to place it in compression or in tension. Raising the upper end of the helical spring to place it in tension causes the device to operate at a lower pressure than when the helical spring is in neither compression nor tension, or is in compression. The greater the tension, the less the pressure required to move the piston, and hence cause the disc spring to snap.

Lowering the upper end of the helical spring to place it in compression causes the device to operate at a higher pressure level. When the helical spring is compressed, higher pressure must be applied to the piston to cause it to move and effect snap of the disc spring.

Such positioning of the helical spring to subtract from or add force to that of the disc spring is a great advantage for low pressure devices that must be made inexpensively and still be highly accurate and reliable in operation. It should be noted that the operation of the helical spring in this invention causes forces to be applied in the opposite directions to that of the disc spring than does the helical spring in the invention described and claimed in my aforesaid copending application in which the stiffening effect of a limp diaphragm is substantial and must be compensated for at high pressures, e.g., above 400 psi. In the present invention, the helical spring is operable as described in a device having a limp diaphragm and which is operable at pressure levels, e.g., below 400 psi, where the stiffening effect of the diaphragm is not pronounced as at the higher pressures. Thus, the spring system described herein is operable as described for a device that includes a piston or a limp diaphragm, or even a plunger, via which to actuate the disc spring. On this latter point, the piston may be operable as a plunger to which physical force is applied instead of fluid pressure.

Figure 8:
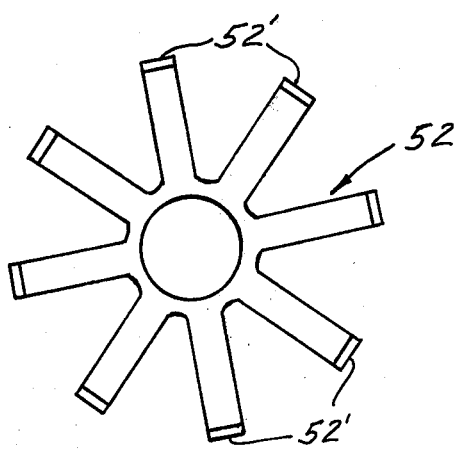
FIG. 8 is a bottom view of the adjustment wheel of the device of FIG. 1 which is threaded onto the exterior of the tubular housing along with the nut member shown in FIG. 1 to capture the catch and therewith preset the helical spring condition.

In the device shown, the fingers 50 of the catch 48 are captured between interlocked members 52, 54 which are threaded onto the exterior of the housing 41. The housing 41 is carried on a plate 58 that is seated in the upper portion of the body 16 and suitably secured in place. In the example shown, the upper one of the interlocked members is a multi-arm wheel with depending fingers 52', and the lower one is a nut with diametrically opposed fingers 54' which extend upwardly and are respectively interposed between adjacent arms of the wheel 52. FIG. 8 shows the multi-arm form of the wheel 52, which form facilitates quick assembly.

In such assembly, the fingers 50 of the catch 48 are shown located between washers 60, 62. The washers preferably apply force to the fingers 50 and the faces of the wheel 52 and nut 54 so as to eliminate play or backlash when the directions of the wheel and nut are reversed to move the upper end of the helical spring in the direction opposite to movement to the position to which it was previously moved. The washers may be concave elements for this purpose.

As shown, the fingers 50 of the catch extend through openings 64, 66 in opposite walls of the housing 41. The nut 54 is threaded onto the upper end of the housing, and the washer 62 is placed over the housing and on the upper face of the nut. The catch is inserted in the housing with its fingers 50 extending through the openings, and the catch is manipulated to place its fingers flat against the washer 62. The washer 60 is then placed onto the fingers 50, and the upper wheel 52 is positioned on the housing and threaded thereon with the two nut fingers 54' interlocking with the wheel arms. The plate with the housing 41 and the parts thus assembled therein are lowered and then turned in unison to cause the upper end turns of the helical spring and the body of the catch to be threadedly engaged. The prior assembly of the previously mentioned parts, including threading of the lower end of the helical spring onto the fingers of the pressure plate 30, will be understood. The plate 58 is then secured in position on the body 16 across the top of the cavity 22.

Figure 3:
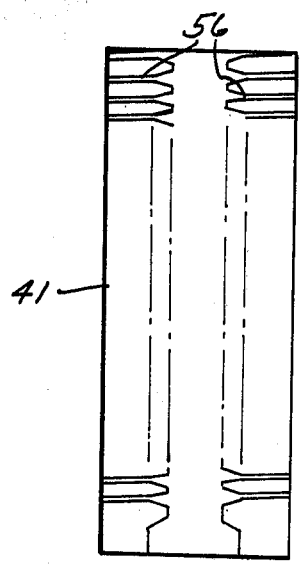
FIG. 3 is a side elevation view of the tubular housing of the device of FIG. 1.
Figure 4:
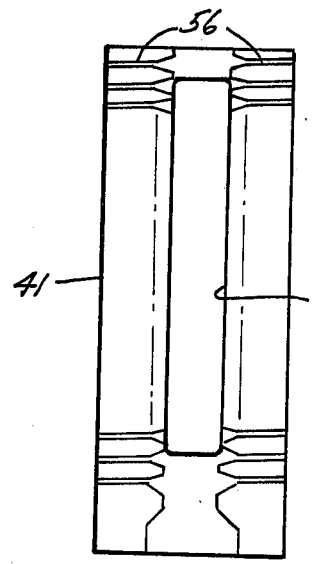
FIG. 4 is a side elevation view of the tubular housing as seen with the housing turned 90° from the position shown in FIG. 3.
Figure 5:
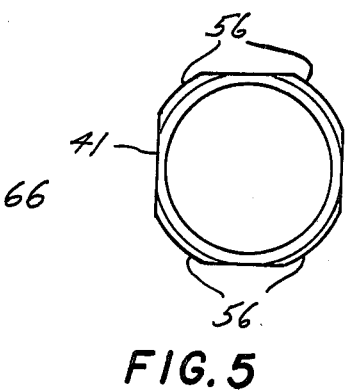
FIG. 5 is an end view of the tubular housing.

In the embodiment shown, the housing 41 (see FIGS. 3-5) is made of inexpensive squared tubing that is exteriorly threaded, whereby the threads 56 are interrupted by the flat faces, two opposed faces of which have the openings 64, 66 formed therein. One of the remaining flat faces is used for a pressure scale (not shown) to aid the person who sets the pressure operating level, as by turning the wheel 52 until the upper end of its hub is aligned with the pressure setting desired. In a typical example, the scale has indicia for 50 psi increments starting with 100 psi at the top and extending to 300 psi partway down the housing 41.

Figure 2:
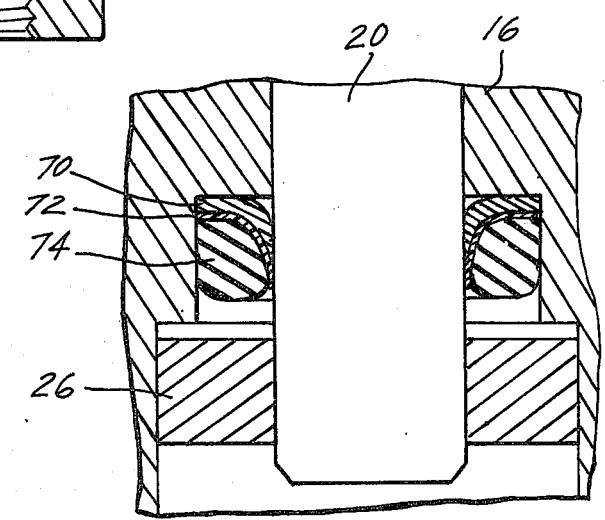
FIG. 2 is an enlarged fragmentary sectional view of the portion of the device of FIG. 1 showing the sealing means of this invention.

By sealing means in accordance with this invention, the deadband and stiction are reduced substantially with respect to piston seals heretofore known. Referring to FIG. 2 along with FIG. 1, a metal sleeve or ring 70 is seated in the upper end of the counterbore surrounding the piston 20. The piston is easily slidable in the metal sleeve 70. The outer diameter of the metal sleeve varies from a maximum at its upper end to a minimum at its lower end, such as a tapering form shown. The lower end has a small radius, e.g., 0.002-in. in one example.

A plastic sleeve 72 of material characterized by good wearing qualities, e.g., Teflon, is placed around the metal sleeve 70, and extends at its lower end below the lower end of the metal sleeve. An O-ring 74 is positioned around the plastic sleeve, and is of such size that it remains captured between the plastic sleeve and the vertical wall of the counterbore.

Further in this regard, the application of fluid pressure via the port 18 causes the O-ring 74 to apply a substantial portion of the load to the metal sleeve 70 via the plastic sleeve 72. This load would, in the absence of the sleeves, normally be applied to radially grip the piston directly and create undesirably large static friction. However, since the metal sleeve does not transmit such forces to the piston, the only sealing force is limited to that with which the O-ring causes the lower end of the plastic sleeve to engage the piston. Sealing by the mechanism of this invention more closely resembles a line squeeze around the piston. Due to the effectiveness of this sealing means, it has been found that deadband width is substantially reduced over comparable structures heretofore known. Pressure switches with smaller pistons are usable at given pressure levels than could heretofore be realized.

In one example, a pressure switch as above described has sealing mechanism in which the metal sleeve 70 is formed of a steel stamping in which the flange at the upper end is of the order of 0.020-in.; the plastic sleeve 72 is formed from a sheet of Teflon 0.008-in. thick; and the O-ring 74 has a cross-section diameter of 0.040-in. The plastic sleeve in this example extends 0.020-in. below the lower end of the metal ring. Thus, a portion of the lower end of the plastic sleeve is forced against the rounded lower end of the metal sleeve, so that the portion of the plastic sleeve in sealing engagement with the piston is approximately 0.018-in. wide. The piston is 3/16-in. in diameter in this example. The pressure switch with such sealing mechanism is operable at 1,000 psi with a 100-psi deadband. Such pressure switch with the sealing means removed and replace with conventional O-ring sealing cannot be operated at such pressure level and narrow deadband characteristics, but requires a piston approximately double the diameter, e.g., approximately ⅜-in. diameter.

I claim:

1. In combination in a fluid pressure responsive device:
   a body having a bore extending from one surface and a counterbore extending from a surface opposite to said one surface;
   a piston slidable in said bore;
   and a sealing mechanism for said piston including
      a metal sleeve seated in the inner end of said counterbore,
         said metal sleeve having an outer diameter that varies from maximum at said inner end to a minimum at its opposite end;
      a plastic sleeve surrounding said metal sleeve,
         said plastic sleeve extending past the opposite end of said metal sleeve;
      and an O-ring around said plastic sleeve,
         said O-ring being operable upon the introduction of fluid pressure through said counterbore to force the portion of said plastic sleeve extending past said opposite end of said metal sleeve into sealing engagement with said piston, the remaining portion of the load being applied to said metal sleeve.

2. The combination of claim 1, wherein the fluid pressure responsive device includes:
   a pressure plate at said one surface engaged by the end of said piston, said plate having a rim;
   a snap disc spring having its body engaging the rim of said pressure plate intermediate the inner and outer peripheries of said spring;
   means holding the outer periphery of said spring in stationary position;
   a yoke member having leg portions at one end in locking engagement with the inner periphery of said spring;
   and a movable element engaged by the opposite end of said yoke member,
      said inner periphery of said spring and said yoke member undergoing axial movement in response to a predetermined pressure applied to said piston through said counterbore to actuate said movable element,
      the distance of said axial movement being a predetermined multiple of the movement of said rim of said pressure plate and the portion of the body of said spring engaged by said plate, said rim acting as a fulcrum whereby the distance thereof from the inner periphery of said spring determines the extent to which movement of said plate is multiplied by said yoke member.

3. The combination of claim 2, further including:
   a helical spring surrounding said yoke member;
   means holding one end of said helical spring in engagement with said pressure plate;
   and means supporting the opposite end of said helical spring in one of a plurality of positions relative to said one end thereof,
      said supporting means being adjustable to position said opposite end of said helical spring so that said helical spring is in compression in some positions of the opposite end thereof and in tension in other positions of the opposite end thereof.

4. The combination of claim 3, wherein said supporting means includes a housing surrounding said helical spring;
   a catch member engaging said opposite end of said helical spring,
      said catch member having fingers,
      said housing having openings through which said fingers extend;
   and adjustable positioning means capturing said fingers and operable to move said catch member, and hence said opposite end of said helical spring, to one of said plurality of positions.

5. The combination of claim 4, wherein said housing is externally threaded, and said adjustable positioning means includes a pair of threaded members between which said fingers of said catch member are captured, said threaded members being interlocked.

6. The combination of claim 5, wherein said housing is a square-like tubular element, and the threads on the exterior of said housing are interrupted by the flat sides thereof.

7. The combination of claim 6, wherein a plate has one end of said housing secured thereto,
   said body having a cavity in which the floor is the surface from which said bore extends,
   said cavity being threaded;
   a retaining ring positioned one said snap disc spring adjacent the outer periphery thereof;

a ring nut threaded into said cavity and engaging said retainer ring;

and means securing said plate to said body.

8. In combination:

a snap action disc spring;

stationary means holding the outer periphery of said disc spring;

a pressure plate on which said disc spring is located;

a helical spring;

means engaging one end of said helical spring to said pressure plate;

and means engaging the other end of said helical spring and operable to move said other end and to hold it in a selected position, said moving and holding means being operable to place said helical spring in both tension and compression by movement thereof;

and a member in direct physical contact with said pressure plate and operable upon application of force of predetermined magnitude thereto to actuate said pressure plate and effect snap of said disc spring;

and an element movable upon snap of said disc spring to manifest such snap by operating a movable element of an electric switch, said helical spring when in tension causing said disc spring to snap at a force less than the force required to effect such snap when said helical spring is in compression.

9. The combination of claim 8, wherein said member in direct physical contact with said pressure plate is a piston.

* * * * *